United States Patent [19]
Walker

[11] Patent Number: 6,077,011
[45] Date of Patent: Jun. 20, 2000

[54] PUSH BUTTON PANEL FASTENER

[76] Inventor: Philip Marvin Walker, P.O. Box 1076, San Juan Capo, Calif. 92693

[21] Appl. No.: 09/366,339

[22] Filed: Aug. 2, 1999

[51] Int. Cl.[7] .............................. F16B 21/00; A41F 1/00; A44B 1/04
[52] U.S. Cl. .............................. 411/348; 24/453; 292/252
[58] Field of Search ..................................... 411/267, 270, 411/348, 347, 433; 24/453; 292/252, DIG. 37, DIG. 42

[56] References Cited

U.S. PATENT DOCUMENTS

| | | | |
|---|---|---|---|
| 3,827,110 | 8/1974 | Dzus, Sr. et al. | 411/348 X |
| 5,340,255 | 8/1994 | Duran | 411/348 X |
| 5,494,323 | 2/1996 | Huang | 24/453 X |
| 5,775,725 | 7/1998 | Hodac et al. | 411/348 X |

*Primary Examiner*—Neill Wilson
*Attorney, Agent, or Firm*—Goldstien & Canino

[57] ABSTRACT

A push button panel fastener including a female portion disposed within an opening in a fixed surface. A male portion is secured to a movable panel and is adapted for removably coupling with the female portion for temporarily securing the movable panel to the fixed surface.

7 Claims, 2 Drawing Sheets

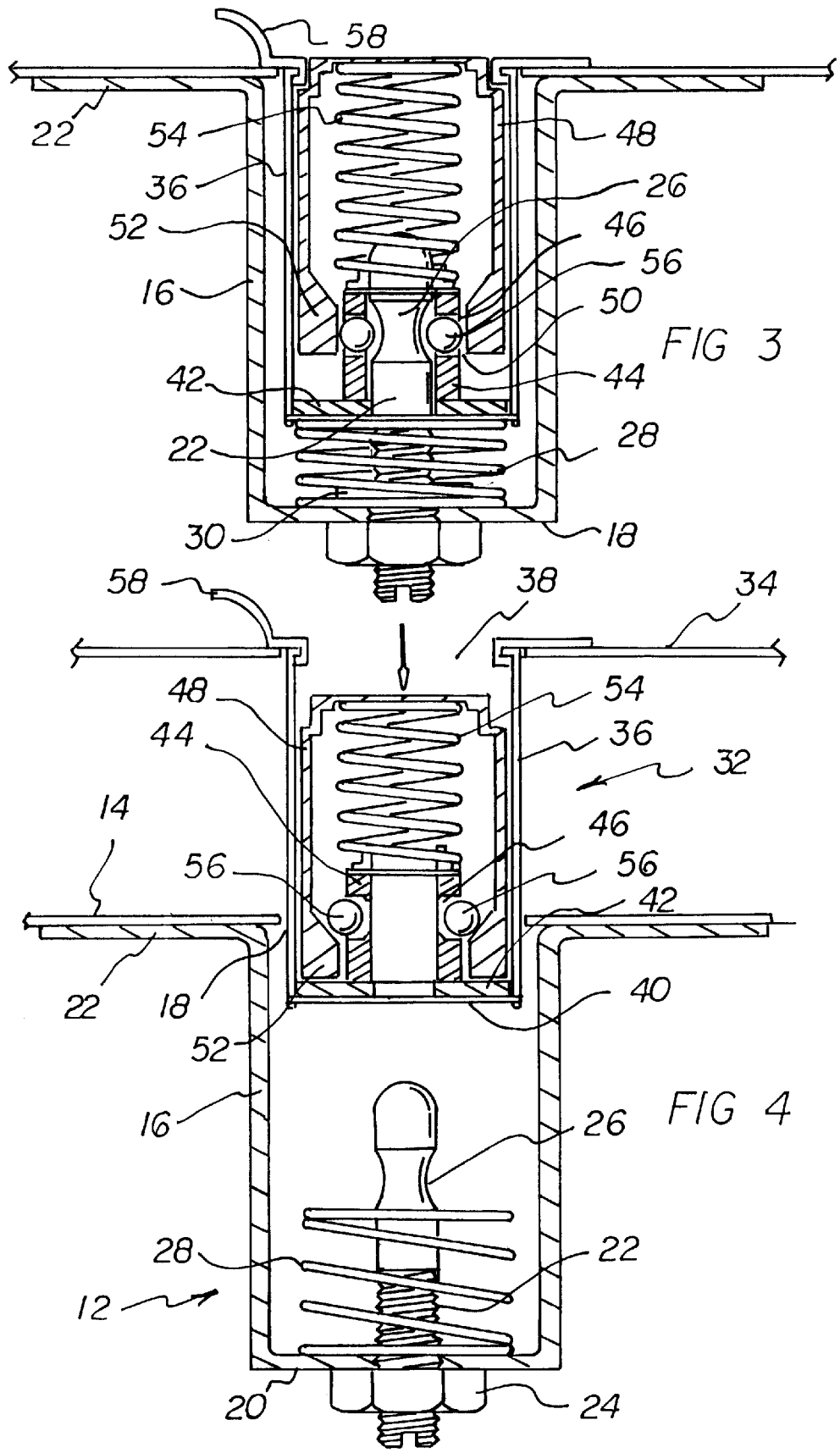

PUSH BUTTON PANEL FASTENER

BACKGROUND OF THE INVENTION

The present invention relates to a push button panel fastener and more particularly pertains to quickly fastening and releasing a sheet metal panel.

The use of fastening devices is known in the prior art. More specifically, fastening devices heretofore devised and utilized for the purpose of fastening objects together are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,706,868 to Hammerle discloses an automated system for installing push-in panel fasteners. U.S. Pat. No. 4,596,094 to Teller discloses a fastener for attaching wall panels capable of being deformed to allow for installation. U.S. Pat. No. 5,437,174 to Aydin discloses a door locking system.

While these devices fulfill their respective, particular objective and requirements, the aforementioned patents do not describe a push button panel fastener for quickly fastening and releasing a sheet metal panel.

In this respect, the push button panel fastener according to the present invention substantially departs from the conventional concepts and designs of the prior art, and in doing so provides an apparatus primarily developed for the purpose of quickly fastening and releasing a sheet metal panel.

Therefore, it can be appreciated that there exists a continuing need for new and improved push button panel fastener which can be used for quickly fastening and releasing a sheet metal panel. In this regard, the present invention substantially fulfills this need.

SUMMARY OF THE INVENTION

In the view of the foregoing disadvantages inherent in the known types of fastening devices now present in the prior art, the present invention provides an improved push button panel fastener. As such, the general purpose of the present invention, which will be described subsequently in greater detail, is to provide a new and improved push button panel fastener and method which has all the advantages of the prior art and none of the disadvantages.

To attain this, the present invention essentially comprises a female portion disposed within an opening in a fixed surface. The female portion includes a cylindrical housing having an open upper end, a closed lower end, and a cylindrical side wall therebetween. The open upper end has a flange secured thereto. The closed lower end has an aperture therethrough. The aperture receives a threaded bolt upwardly therethrough. The threaded bolt is engaged to the closed lower end by a nut. The threaded bolt has a seating recess formed therein downwardly of an upper end thereof. The threaded bolt has a spring disposed therearound. The spring has its lower end secured to the closed lower end by a retainer. A male portion is secured to a movable panel and is adapted for removably coupling with the female portion for temporarily securing the movable panel to the fixed surface. The male portion includes a cylindrical housing having an open upper end, a closed lower end, and a cylindrical side wall therebetween. The closed lower end has an aperture therethrough. The aperture has a washer disposed thereover. The washer has an inner cylinder extending upwardly therefrom surrounding the apertures. The inner cylinder has diametrically opposed apertures therethrough. A movable cam is slidably disposed within the open upper end of the cylindrical housing. The movable cam has an open lower end for receiving the inner cylinder therein. The open lower end of the cam has beveled protrusions on an interior surface thereof. An upper end of the movable cam has a spring secured thereto. A lower end of the spring is secured to an upper end of the inner cylinder. A set of three balls are disposed within the movable cam for positioning within the apertures of the inner cylinder and engaging the seating recess of the threaded bolt of the female portion when the threaded bolt is positioned through the aperture and extends through the inner cylinder in the locked orientation. The cylindrical housing of the male portion has an arcuate handle secured to the open upper end thereof.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved push button panel fastener which has all the advantages of the prior art fastening devices and none of the disadvantages.

It is another object of the present invention to provide a new and improved push button panel fastener which may be easily and efficiently manufactured and marketed.

It is a further object of the present invention to provide a new and improved push button panel fastener which is of durable and reliable construction.

An even further object of the present invention is to provide a new and improved push button panel fastener which is susceptible of a low cost of manufacture with regard to both materials and labor, and which accordingly is then susceptible of low prices of sale to the consuming public, thereby making such a push button panel fastener economically available to the buying public.

Even still another object of the present invention is to provide a new and improved push button panel fastener for quickly fastening and releasing a sheet metal panel.

Lastly, it is an object of the present invention to provide a new and improved push button panel fastener including a female portion disposed within an opening in a fixed surface. The female portion includes a cylindrical housing having an open upper end, a closed lower end, and a cylindrical side wall therebetween. The closed lower end has an aperture therethrough. The aperture receives a threaded bolt upwardly therethrough. The threaded bolt has a seating recess formed therein downwardly of an upper end thereof. The threaded bolt has a spring disposed therearound. A male portion is secured to a movable panel and is adapted for removably coupling with the female portion for temporarily securing the movable panel to the fixed surface. The male portion includes a cylindrical housing having an open upper end, a closed lower end, and a cylindrical side wall therebetween. The closed lower end has an aperture therethrough. The washer has an inner cylinder extending upwardly therefrom surrounding the apertures. The inner cylinder has diametrically opposed apertures therethrough. A movable cam is slidably disposed within the open upper end of the cylindrical housing. The movable cam has an open lower end for receiving the inner cylinder therein. The open lower end of the cam has beveled protrusions on an interior surface thereof. An upper end of the movable cam has a spring secured thereto. A lower end of the spring is secured to an upper end of the inner cylinder. A pair of retaining balls are disposed within the movable cam for positioning within the apertures of the inner cylinder and engaging the seating recess of the threaded bolt of the female portion when the threaded bolt is positioned through the aperture and extends through the inner cylinder in the locked orientation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross-sectional view of the present invention as taken a g line 3—3 of FIG. 1.

FIG. 4 is a cross-sectional view of the present invention illustrated in a released orientation.

The same reference numerals refer to the same parts through the various figures.

DESCRIPTION OF THE PREFERRED EMBODIMENT

Figure 1:
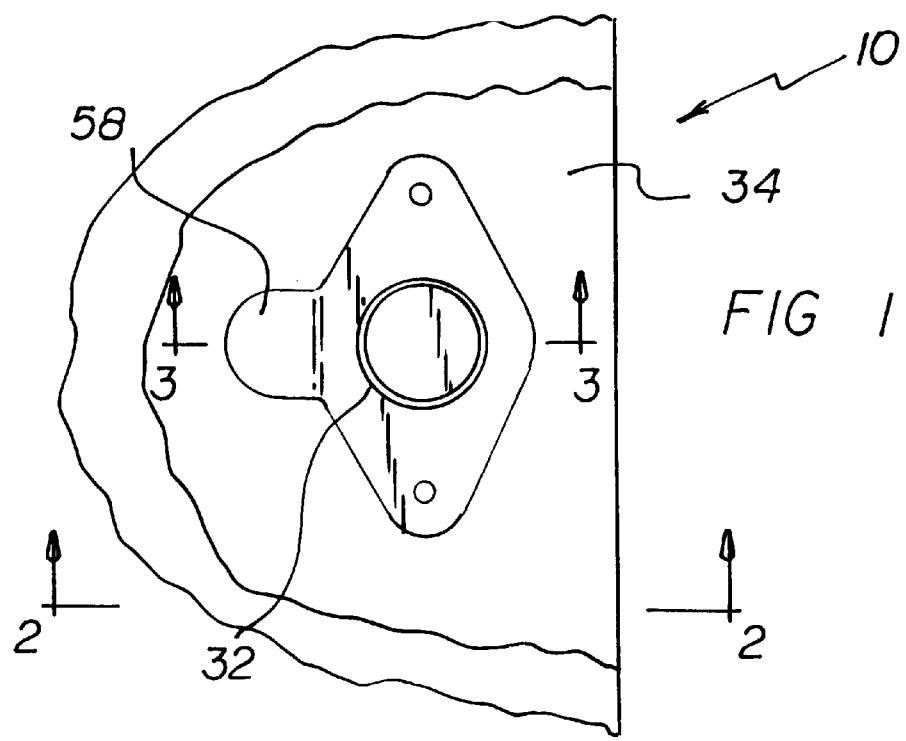
FIG. 1 is a perspective view of the preferred embodiment of the push button panel fastener constructed in accordance with the principles of the present invention.
Figure 2:
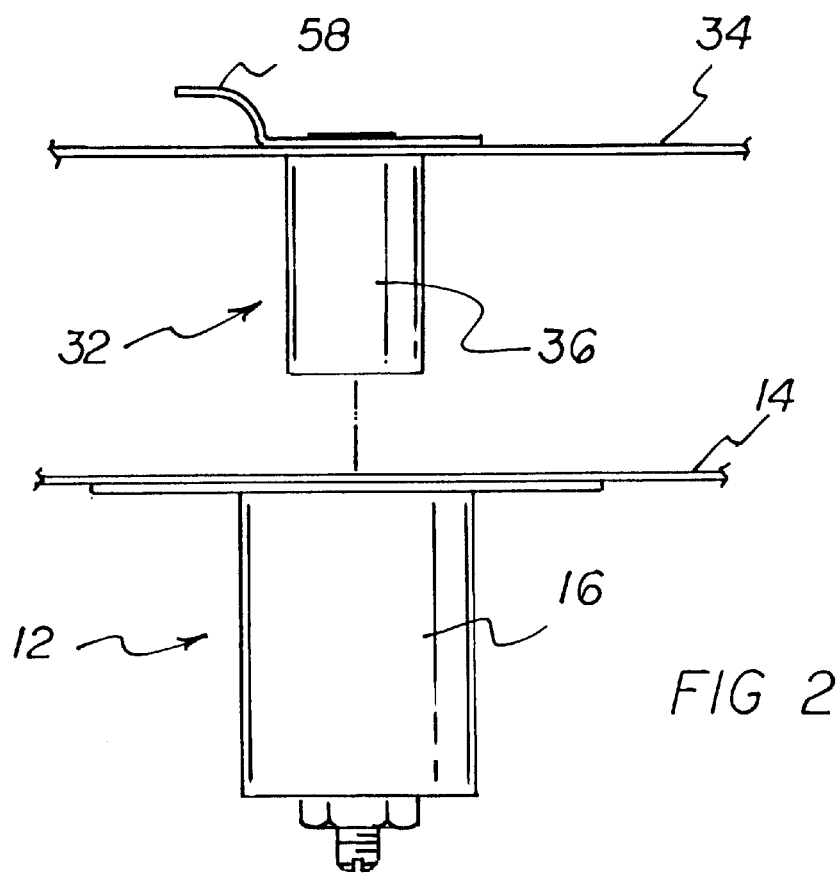
FIG. 2 is a side view of the present invention as taken along line 2—2 of FIG. 1.

With reference now to the drawings, and in particular, to FIGS. 1 through 4 thereof, the preferred embodiment of the new and improved push button panel fastener embodying the principles and concepts of the present invention and generally designated by the reference number 10 will be described.

Specifically, it will be noted in the various Figures that the device relates to a push button panel fastener for quickly fastening and releasing a sheet metal panel. In its broadest context, the device consists of a female portion and a male portion. Such components are individually configured and correlated with respect to each other so as to attain the desired objective.

The female portion 12 is disposed within an opening in a fixed surface 14. The female portion 12 includes a cylindrical housing 16 having an open upper end 18, a closed lower end 20, and a cylindrical side wall therebetween. The open upper end 18 has a flange 22 secured thereto. The closed lower end 20 has an aperture therethrough. The aperture receives a threaded bolt 22 upwardly therethrough. The threaded bolt 22 is engaged to the closed lower end 20 by a nut 24. The threaded bolt 22 has a seating recess 26 formed therein downwardly of an upper end thereof. The threaded bolt 22 has a spring 28 disposed therearound. The spring 28 has its lower end secured to the closed lower end 20 by a retainer 30.

The male portion 32 is secured to a movable panel 34 and is adapted for removably coupling with the female portion 12 for temporarily securing the movable panel 34 to the fixed surface 14. The male portion 32 includes a cylindrical housing 36 having an open upper end 38, a closed lower end 40, and a cylindrical side wall therebetween. The closed lower end 40 has an aperture therethrough. The aperture has a washer 42 disposed thereover. The washer 42 has an inner cylinder 44 extending upwardly therefrom surrounding the aperture. The inner cylinder 44 has diametrically opposed apertures 46 therethrough. A movable cam 48 is slidably disposed within the open upper end 38 of the cylindrical housing 36. The movable cam 48 has an open lower end 50 for receiving the inner cylinder 44 therein. The open lower end 50 of the cam 48 has beveled protrusions 52 on an interior surface thereof. An upper end of the movable cam 48 has a spring 54 secured thereto. A lower end of the spring 54 is secured to an upper end of the inner cylinder 44. A set of three balls 56 are disposed within the movable cam 48 for positioning within the apertures 46 of the inner cylinder 44 and engaging the seating recess 26 of the threaded bolt 22 of the female portion 12 when the threaded bolt 22 is positioned through the aperture and extends through the inner cylinder 44 in the locked orientation. Note FIG. 3. The cylindrical housing 36 of the male portion 32 has an arcuate handle 58 secured to the open upper end thereof. In order to release the male portion 32 from the female portion 12, the cam 48 would be pressed inwardly against the urging of the spring 54 to so that beveled protrusions 52 would be positioned beneath the apertures 46 of the inner cylinder 44 thereby allowing the retaining balls 56 to slide outwardly with respect to the apertures 46 and subsequently disengage the seating recess 26 of the threaded bolt 22. Note FIG. 4. This will allow the user to simply grasp the arcuate handle 58 and pull outwardly to remove the movable panel 34 from the fixed surface 14.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A push button panel fastener for quickly fastening and releasing a sheet metal panel comprising, in combination:

a female portion disposed within an opening in a fixed surface, the female portion including a cylindrical housing having an open upper end, a closed lower end, and a cylindrical side wall therebetween, the open upper end having a flange secured thereto, the closed lower end having an aperture therethrough, the aperture receiving a threaded bolt upwardly therethrough, the threaded bolt being engaged to the closed lower end by a nut, the threaded bolt having a seating recess formed therein downwardly of an upper end thereof, the threaded bolt having a spring disposed therearound, the spring having its lower end secured to the closed lower end by a retainer;

a male portion secured to a movable panel and adapted for removably coupling with the female portion for temporarily securing the movable panel to the fixed surface, the male portion including a cylindrical housing having an open upper end, a closed lower end, and a cylindrical side wall therebetween, the closed lower end having an aperture therethrough, the aperture having a washer disposed thereover, the washer having an inner cylinder extending upwardly therefrom surrounding the aperture, the inner cylinder having diametrically opposed apertures therethrough, a movable cam slidably disposed within the open upper end of the cylindrical housing, the movable cam having an open lower end for receiving the inner cylinder therein, the open lower end of the cam having beveled protrusions on an interior surface thereof, an upper end of the movable cam having a spring secured thereto, a lower end of the spring being secured to an upper end of the inner cylinder, a set of three balls disposed within the movable cam for positioning within the apertures of the inner cylinder and engaging the seating recess of the threaded bolt of the female portion when the threaded bolt is positioned through the aperture and extends through the inner cylinder in the locked orientation, the cylindrical housing of the male portion having an arcuate handle secured to the open upper end thereof.

2. A push button panel fastener for quickly fastening and releasing a sheet metal panel comprising, in combination:

a female portion disposed within an opening in a fixed surface, the female portion including a cylindrical housing having an open upper end, a closed lower end, and a cylindrical side wall therebetween, the closed lower end having an aperture therethrough, the aperture receiving a threaded bolt upwardly therethrough, the threaded bolt having a seating recess formed therein downwardly of an upper end thereof, the threaded bolt having a spring disposed therearound;

a male portion secured to a movable panel and adapted for removably coupling with the female portion for temporarily securing the movable panel to the fixed surface, the male portion including a cylindrical housing having an open upper end, a closed lower end, and a cylindrical side wall therebetween, the closed lower end having an aperture therethrough, an inner cylinder extending upwardly therefrom surrounding the aperture, the inner cylinder having diametrically opposed apertures therethrough, a movable cam slidably disposed within the open upper end of the cylindrical housing, the movable cam having an open lower end for receiving the inner cylinder therein, the open lower end of the cam having beveled protrusions on an interior surface thereof, an upper end of the movable cam having a spring secured thereto, a lower end of the spring being secured to an upper end of the inner cylinder, a set of three balls disposed within the movable cam for positioning within the apertures of the inner cylinder and engaging the seating recess of the threaded bolt of the female portion when the threaded bolt is positioned through the aperture and extends through the inner cylinder in the locked orientation.

3. The push button panel fastener as set forth in claim 2 wherein the open upper end of the cylindrical housing of the female portion has a flange secured thereto.

4. The push button panel fastener as set forth in claim 2 wherein the threaded bolt is engaged to the closed lower end by a nut.

5. The push button panel fastener as set forth in claim 2 wherein the spring of the female portion has its lower end secured to the closed lower end by a retainer.

6. The push button panel fastener as set forth in claim 2 wherein the aperture of the closed lower end of the cylindrical housing of the male portion has a washer disposed thereover.

7. The push button panel fastener as set forth in claim 2 wherein the cylindrical housing of the male portion has an arcuate handle secured to the open upper end thereof.

* * * * *